United States Patent [19]

Kasselmann et al.

[11] 3,948,567
[45] Apr. 6, 1976

[54] SWAY CONTROL MEANS FOR A TRAILER

[75] Inventors: John T. Kasselmann; Henry Dorsett; Harold J. Burkett, all of South Bend, Ind.

[73] Assignee: The Bendix Corporation, South Bend, Ind.

[22] Filed: Feb. 12, 1975

[21] Appl. No.: 549,406

[52] U.S. Cl............... 303/7; 180/103 BF; 280/432; 280/446 B; 303/24 R
[51] Int. Cl.² .......................................... B60T 13/08
[58] Field of Search.......... 303/7, 24, 21 CG; 188/3, 188/112; 180/103, 82 R; 280/432, 446 B

[56] References Cited
UNITED STATES PATENTS

| | | |
|---|---|---|
| 2,856,036 | 10/1958 | Mullen ........................ 180/103 UX |
| 3,288,240 | 11/1966 | Franzel ....................... 280/446 B X |
| 3,398,991 | 8/1968 | Compton ....................... 280/432 X |
| 3,618,983 | 11/1971 | Forse ................................ 280/432 |
| 3,715,003 | 2/1973 | Jubenville ........................ 303/7 X |
| 3,758,165 | 9/1973 | Savelli ............................. 303/7 X |
| 3,790,807 | 2/1974 | Rossigno ............................. 303/7 |
| 3,819,234 | 6/1974 | Couchois .......................... 303/7 X |
| 3,856,363 | 12/1974 | Kasselmann ......................... 303/7 |
| 3,861,489 | 1/1975 | Lang et al. ....................... 303/7 X |
| 3,893,692 | 7/1975 | Presley et al. ...................... 303/7 |

*Primary Examiner*—Trygve M. Blix
*Assistant Examiner*—Douglas C. Butler
*Attorney, Agent, or Firm*—Leo H. McCormick, Jr.; William N. Antonis

[57] ABSTRACT

A sway control apparatus for use in a tow vehicle trailer braking system that provides a brake applying servomotor in the trailer with an independent actuation signal to attenuate oscillary forces which may develop between the trailer and the tow vehicle.

7 Claims, 4 Drawing Figures

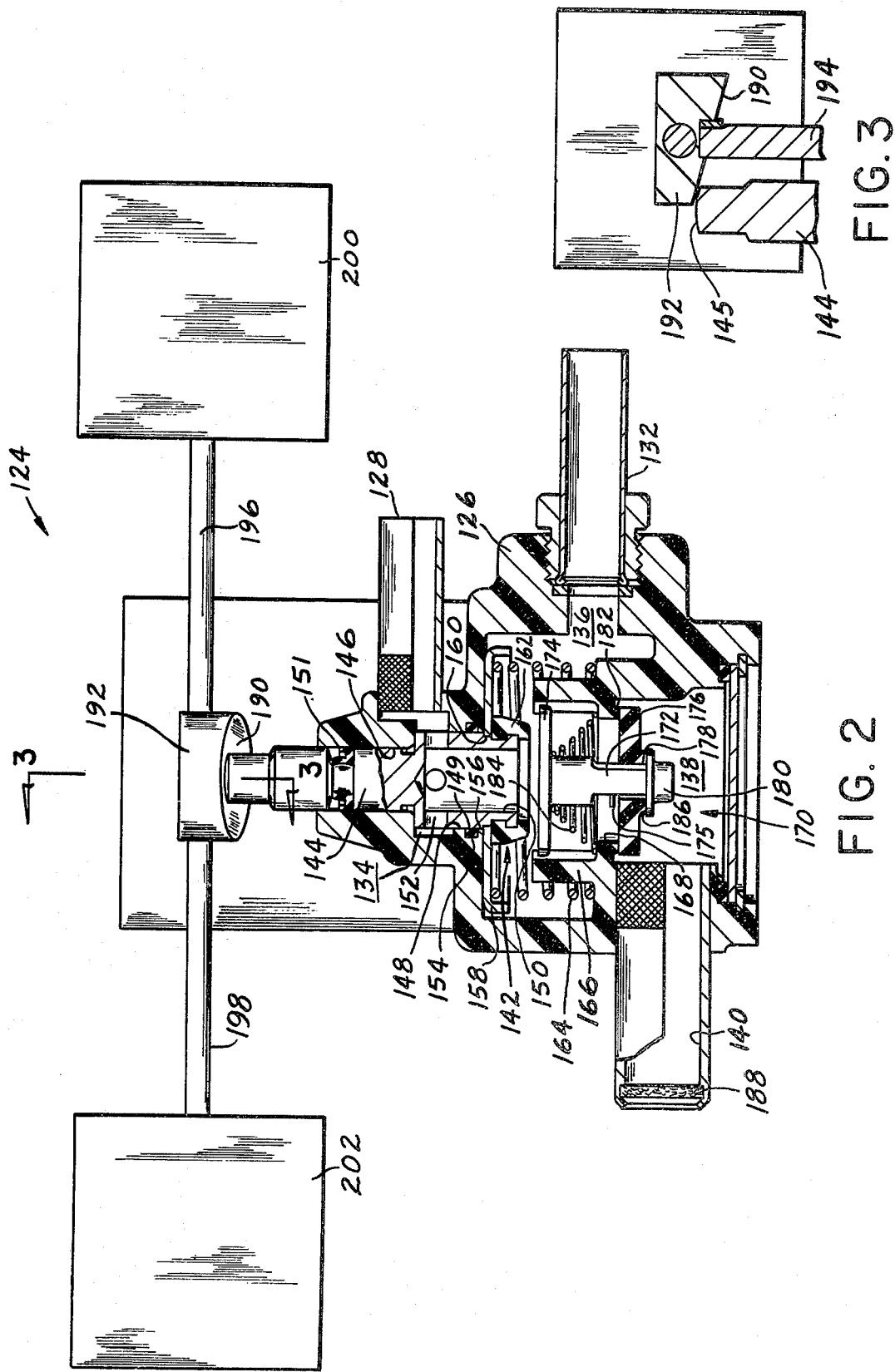

SWAY CONTROL MEANS FOR A TRAILER

BACKGROUND OF THE INVENTION

With an ever increasing number of people purchasing recreational vehicles, it is of the upmost importance that stability between the tow vehicle and the trailer be maintained while traveling at turnpike speeds. One form of instability exhibited by these vehicles is swaying, where the trailer oscillates back and forth similar to a pendulum. Another stability problem can occur during a quick lane change. This can result in severe yawing in the trailer which can lead to loss of control of the tow vehicle. Similar yawing can be caused by passing or being passed by a semi-trailer or by a gusty crosswind. In addition, two vehicle-trailer combinations have a critical speed above which control is difficult or impossible to uniformly maintain. This critical speed is usually somewhat slower than the desired speed for highway driving creating a hindrance for a smooth traffic flow pattern.

To alleviate these sway stability problems some of the larger trailers are equipped with damping or spring devices attached to the hitch. These damping devices normally consist of at least one shock absorber located on opposite sides of the tongue of the trailer. These devices improve trailer control at low speeds, but do not effect the critical speed so that the safe speed is still limited.

In addition, stiffening of the sidewalls of the tires on the trailer have helped to dampen some of the sway forces when traveling at low speeds. However, it has been found that at high speeds the damping characteristics of the tires have little overall effect on the total oscillatory movement of the trailer.

In U.S. Pat. No. 3,893,692, incorporated herein by reference, an anti-sway apparatus is disclosed which has a comparator that can supply an actuation signal for applying a servomotor in the trailer when an oscillary force reaches a predetermined value. A first sensor is located in the front and a second sensor is located in the rear of the trailer while the comparator is located at the center of gravity of the vehicle. As long as the first and second sensors supply substantially the same indication of movement in the trailer, the comparator will remain inactive. However, due to the cost and critical limitations necessary to properly install the first and second sensors, this approach has not received substantial industry approval.

SUMMARY OF THE INVENTION

We have invented a sway control means for use in a tow vehicle-trailer braking system which senses lateral movement of the trailer and supplies a servomotor therein with an independent actuation signal to operate the wheels brakes in the trailer.

The sway control means is located in the conduit which carries an operational signal from the tow vehicle to the trailer. The sway control means has a housing with an entrance port, an exit port and an atmospheric port. A distribution valve means regulates the flow of a first actuation signal from the tow vehicle in a first flow path between the entrance port and the exit port. A poppet valve means regulates the flow of air through the atmospheric port to establish a second flow path between the atmospheric port and the exit port. A first resilient means holds the distribution valve in a released position while a second resilient means maintains the poppet valve means in a closed position. A weight means responsive to oscillations in the trailer is adapted to sequentially move the distribution valve means and interrupt the communication through the first flow path between the entrance port and the exit port while actuating the poppet valve means to permit air to flow through the atmospheric port into the second flow path to provide an independent actuation signal which operates the wheel brakes in the trailer. With the wheel brakes in the trailer activated, the acceleration of the tow vehicle and the acceleration in the trailer will be slightly different. This difference in acceleration will be experienced as a drag on the trailer causing the tow vehicle trailer combination to approach a straight line.

It is therefore the object of this invention to provide a tow vehicle-trailer braking system with an anti-sway control means for independently applying the wheel brakes in the trailer to attenuate oscillations therein by changing the rate of acceleration between the tow vehicle and the trailer.

It is another object of this invention to provide an anti-sway means with a weight means for controlling the communication between an atmospheric port and a brake applying servomotor to independently activate the wheel brakes on the trailer.

It is a further object of this invention to provide a control means responsive to oscillating angular acceleration for actuating the wheel brakes of a trailer independently of a tow vehicle.

It is a still further object of this invention to provide a servomotor in a trailer, which is activated by a braking signal from a tow vehicle, with a sway sensor for independently actuating the servomotor when the trailer is subjected to a predetermined lateral oscillation.

These and other objects will become apparent from reading this specification and viewing the drawings.

BRIEF DESCRIPTION OF THE DRAWINGS

FIG. 2 is an anti-sway control apparatus for use in the system of FIG. 1 which is responsive to angular changes in acceleration.

FIG. 3 is a sectional view taken along line 3—3 of FIG. 2.

DETAILED DESCRIPTION OF THE PREFERRED EMBODIMENT

Figure 1:
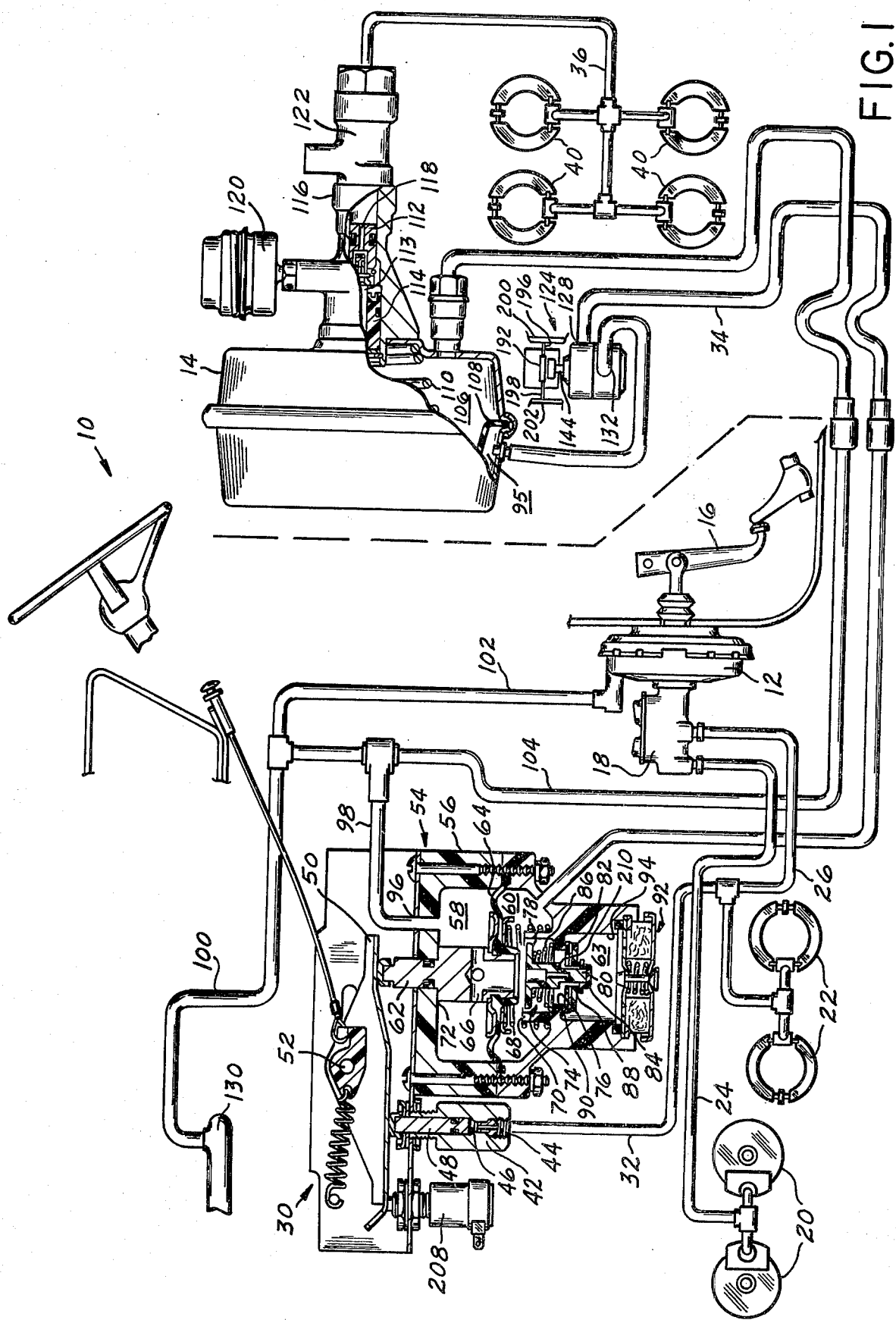
FIG. 1 is a schematic illustration of a tow vehicle-trailer combination showing an anti-sway control for independently actuating a brake applying servomotor in the trailer.

A tow vehicle-trailer braking system 10, shown in FIG. 1 has a first brake applying servomotor 12 in the tow vehicle and a second brake applying servomotor 14 in the trailer. The first brake applying servomotor 12 is actuated by an operator input applied to pedal 16. The pedal 16 upon moving will operate the servomotor 12 to provide master cylinder 18 with a force to move a pressure producing piston means therein and supply the front wheels brakes 20 through conduit 24, and the rear wheel brakes 22, through conduit 26, of the tow vehicle with a braking force.

Conduit 26 is connected to a relay control means 30 by a conduit 32. The braking force supplied the rear wheels 22 is converted by the relay control means into a trailer braking signal and carried on conduit 34 to operate the second brake applying servomotor 14. Upon actuation of the second brake applying servomotor 14, a trailer braking force will be supplied through conduit 36 to the wheel brakes 40 in the trailer.

The relay control means 30 has a housing 42 with a bore 46 in which a piston 48 is located. An entrance port 44 is connected to conduit 32 and to supply piston 48 with hydraulic fluid under pressure. The fluid under pressure will move piston 48 into contact with lever arm 50. The lever arm 50 is mounted on pin 52 and transmits an output signal to a valve means 54.

The valve means 54 has a housing 56 with a vacuum chamber 58, a control chamber 60, and an atmospheric chamber 62. A diaphragm 64 separates the vacuum chamber 58 from the control chamber 60. A shaft 62 which extends through the housing 56 into the vacuum chamber is attached to the diaphragm 64. A passageway 66 located in shaft 62 connects the vacuum chamber 58 with the control chamber 60. A spring 68 which surrounds a guide 70 on the housing 52 in the control chamber 60 urges shoulder 72 against the housing in the vacuum chamber 58.

A poppet valve means 74 is located within the guide 70 for regulating the communication of air at atmospheric pressure between the atmospheric chamber 63 and the control chamber 60 through opening 76. The poppet valve means 74 has a disc 78 attached to a stem 80. A plate 82 is loosely located on stem 80 and retained there by cap 84. A spring 86, located between the housing surrounding opening 76 and the disc 78, urges the cap 84 against a first seat 88 and the plate 82 against a second seat 90 to seal the control chamber 60 from the atmospheric chamber 62.

A filter means 92 is located in the opening 94 to prevent contaminents carried by the air from entering into the atmospheric chamber where they could affect the operating parameters of the valve means 54.

The conduit 34 is connected to the control chamber 60 (when the shoulder 72 held against housing by spring 68) to allow any air present in the power chamber 95 of the second servomotor 14 to be evacuated through the control chamber 60 along passage 66 into vacuum chamber 58 out port 96 by way of conduit 98 to the supply conduit 100 for disposition into the exhaust manifold. The supply conduit 100 has a first branch 102 going to the first servomotor 12 and a second branch 104 which goes to the front chamber 106 of the second servomotor 14. A wall means 108 located in the second servomotor 14 separates the front chamber 106 from the power chamber 95. With vacuum in both the front chamber 108 and the power chamber 95, spring 110 will act on the wall means 108 and move piston 112 in the slave cylinder 116 against the guide bearing 114. Piston 112 has a compensatory passage 118 through which fluid from reservoir 120 can flow into the pressurizing chamber 122 for replenishing any loss which may occur in the distribution system of the trailer brakes.

An anti-sway means 124 is located within the conduit 34 to control the movement of the trailer with respect to the tow vehicle. The anti-sway means 124 is responsive to oscillatory movement in the trailer for momentarily supplying the servomotor 14 with an independent operational signal to activate the servomotor 14 in the trailer and actuate the brakes in the trailer. This will cause the trailer to accelerate at a different rate than the tow vehicle and thereby place a reactionary force on the hitch means (not shown) between the tow vehicle and the trailer.

The anti-sway means 124 is shown in more detail in FIG. 2 as having a housing 126 with an inlet port 128 connected through conduit 34 to the intake manifold 130 through the valve means 54 and an outlet or control port 132 connected to the power chamber 95 of servomotor 14. The housing 126 has a first chamber 134 in which the inlet port 128 is located, a second or control chamber 136 in which the outlet port 132 is located, and an atmospheric chamber 138 in which port 140 going to the atmosphere is located.

A plunger means 142 has a shaft 144 which is held between guide surfaces 146 and 148 to segregate the first chamber 134 from the second chamber 136. The shaft 144 has a bore 150 with a plurality of cross bores 152 to provide controlled communication between the first chamber 134 and the second chamber 136. A first seal 151 located on the plunger 144 will engage the first bearing or guide surface 146 to prevent air from the atmosphere from entering into the first chamber 134. A second seal 154 is located in the second bearing or guide surface 149 and engaging the plunger surface 156 to prevent communication along the bore 148 between the first chamber 134 and the second chamber 136. A plate 158 surrounds the plunger 144 and engages shoulder 160. A resilient end cap 162 has a first section that snaps over the end of the plunger 144 to hold the plate 158 against the shoulder 160.

A spring 164 surrounds a guide 166 extending from around an opening 168 between the control chamber 136 and the atmospheric chamber 138. The spring 164 urges the plate 158 against the housing 126 allowing free communication between the first chamber 134, through cross bore 152, along bore 150 and into the second chamber 136.

A poppet valve means 170 which controls the communication between the control chamber 136 and the atmospheric chamber 138 has a stem 172 with an annular face 174 on a first end. The first end which is located in the control chamber 136 in axial alignment with the resilient end cap 162 and a second end which extends into the atmospheric chamber 138. A resilient disc 176 which is located on the second end of the stem 172 has a larger opening 178 than the stem to establish a first flow path between the atmospheric chamber 138 and the conrol chamber 136. A cap 180 is secured to the second end of the stem 172 to retain the resilient disc 176 adjacent a seat 182 on the housing 126. A spring 184 acts on the annular face 174 to urge cap 180 against a seat 186 on the resilient disc 176 to prevent air from flowing along the first flow path and to urge the resilient disc 176 against the seat 182 to prevent air from flowing along the second flow path into the control chamber 136.

A filter 188 located in the opening 140 will retain any air borne contaminents to prevent the entry of any foreign matter into the atmospheric chamber 136 which could adversely affect the operation of the poppet valve means 170.

The anti-sway means 124 is located in the trailer reasonably close to the servomotor 14 so that any signal therein will be immediately supplied to the rear chamber 95. The stem 144 of the plunger means 142 is mounted in a plane substantially perpendicular to wheels 40 of the trailer or as nearly vertically thereto as possible. As shown in FIG. 3, the stem 144 engages a cam surface 190. The cam surface is located on a disc 192. The disc 192 has an axial opening into which pivot pin 194 is located. A first arm 196 and a second arm 198 extend away from the disc 192 the same distance. A first weight 200 and a second weight 202 are attached to the first and second arms, respectively. The first and the second weights can rotate in a plane substantially parallel to the horizon. The spring 164 is strong enough to maintain the stem 144 at the low point on the cam surface 190 and thereby keep the first and second weights in a stationary position.

MODE OF OPERATION OF THE PREFERRED EMBODIMENT

During a braking situation, the operator will apply an input force to the brake pedal 16 which will operate the servomotor 12 to develop an operational input to activate the master cylinder 18. The output from the master cylinder 18 will simultaneously supply the rear wheels 22 and the piston 48 with an operational force. The piston will pivot arm 50 around pin 52 to simultaneously activate brake light switch 208 and move plunger 62 against disc 78 to interrupt vacuum communication between the vacuum chamber 58 and the control chamber 60. Further movement of the plunger 62 will move stem 80 away from the plate to allow air to enter the control chamber and eliminate the pressure differential across the plate 82. Still further movement of the plunger 62 will move shoulder 210 into engagement with plate 82 to allow air to rapidly enter from the atmospheric chamber 62 to the control chamber 60 around the seat 90. This air under pressure which is a first braking signal, will flow in conduit 34 through the anti-sway means 124, by flowing through the first chamber 134 in the cross bore 152 into bore 150, to the control chamber 136 and unobstructed before passing out port 132 to the power chamber 95. With air in the power chamber 95 and vacuum in the front chamber 196, a pressure differential will be created across wall means 108 which will move the push rod 113 to initially close the compensating port 118 and allow the fluid in cylinder 122 to be pressurized and supply the wheel brakes 40 with an activation force at substantially the same time the wheel brakes 22 are activated, to provide uniformity in the braking of the tow vehicle and the trailer. Upon termination of the input force on pedal 16, spring 68 will move plunger 62 and pivot the lever arm 50 around pin 52 to reposition piston 48 in bore 46 and to deactivate brake light switch 208. A plunger 62 moves, spring 86 will urge face 88 against cap 84 and resilient disc 82 against seat 90 to close the communication between chamber 60 and chamber 62. Further movement of the plunger will cause disengagement with the disc 78 to allow vacuum present in chamber 58 to evacuate the air in power chamber 58 to the intake manifold 130. As the air is evacuated from the power chamber 95, the pressure differential will be proportionally reduced to permit spring 110 to urge wall 108 toward the power chamber 95 and proportionally reduce the pressure of the fluid in the cylinder and that actuating the wheel brakes 40. When the pressure in the power chamber 95 is equal to that in the vacuum chamber 106, piston 112 will be against stop 114 and the pressure in chamber 122 will be reduced to zero.

As long as the trailer is following the tow in a straight line, the weights 200 and 202 in the anti-sway means will remain substantially stationary. However when swaying occurs, there will be a lag in the movement of the weights 200 and 202 and the mass of the trailer. When the angular force which develops because of the sway is sufficient to overcome spring 164, plunger 144 will move on guides 146 and 149 to bring resilient cap 162 into engagement with disc 174. With cap 162 engaged with disc 174, vacuum communication in conduit 34 between the power chamber 95 and the manifold 130 will be interrupted. Further movement of plunger 144 as the end 145 moves on cam face 190 will move cap 180 away from seat 186 to allow air to enter chamber 136 through the first flow path along opening 178 and reduce the pressure differential across the resilient disc 176. This reduction in pressure differential will allow tabs 175 to engage and move the disc 176 away from seat 182 and allow a larger volume of air to enter the control chamber 136 for presentation to the power chamber 95. With air in the power chamber 95 and vacuum present in chamber 106, an independent actuation signal will have been created whicch will move piston 112 and pressurize fluid in cylinder 122. This pressurized fluid will be carried through conduit 36 to activate the wheel brakes 40 in the trailer. With the wheels brakes 40 activated, the acceleration in the trailer will be reduced sufficiently to cause a drag on the tow vehicle which will straighten out the tow vehicle-trailer combination.

Figure 4:
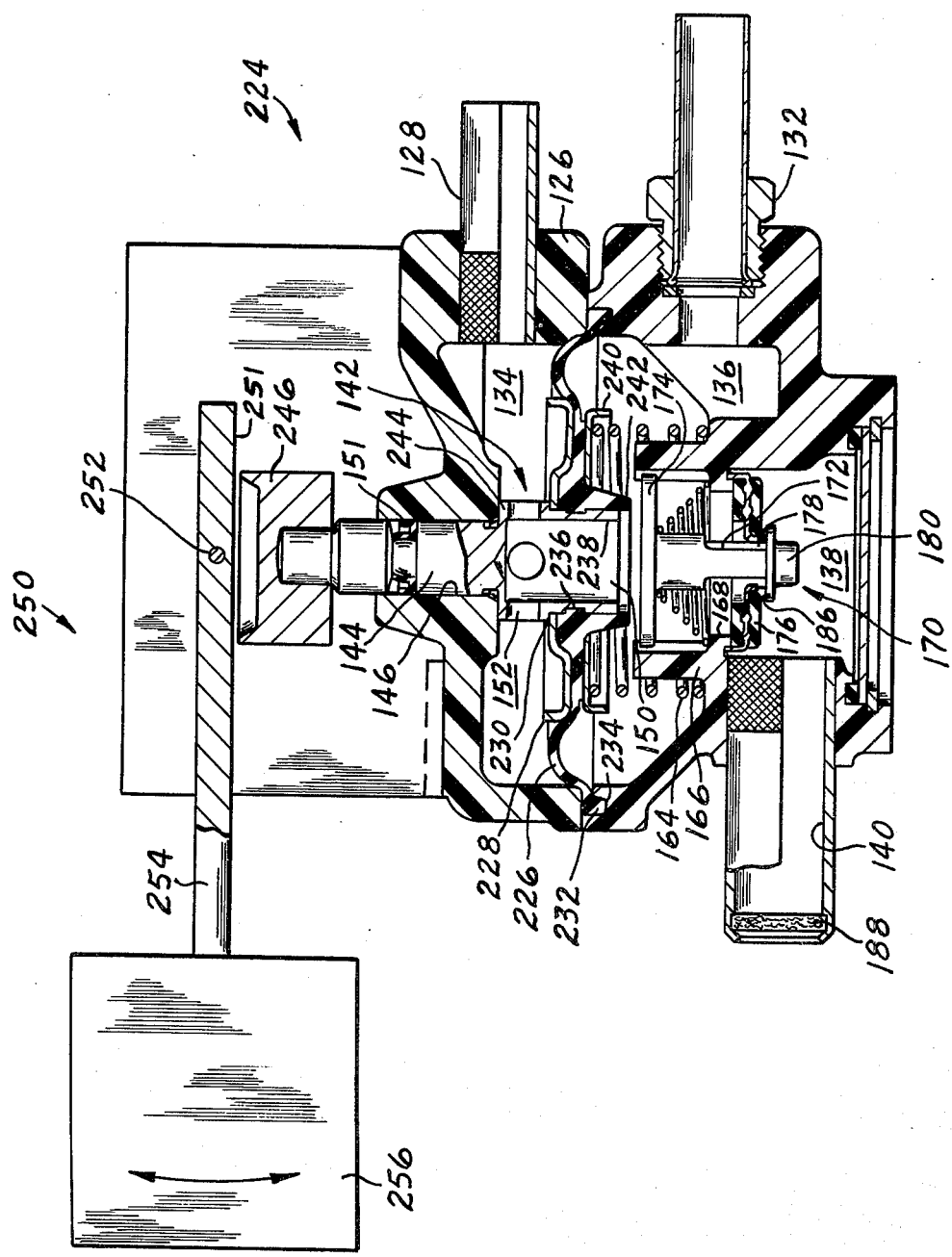
FIG. 4 is an anti-sway control apparatus for use in the system of FIG. 1 which is responsive to changes in lateral acceleration.

The embodiment of the anti-sway means 224 shown in FIG. 4 is similar to that as shown in FIG. 2 and where appropriate the same numerical designation will be used for the corresponding elements.

The anti-sway means 224 has a movable partition means 226 which separates the first chamber 134 from the second or control chamber 136. The movable partition means 226 has a first plate 228 which abuts shoulder 230 on the plunger means 144, a diaphragm which has a periphery 232 held in a groove 234 in the housing 126 and a rib 236 which snaps into a groove 238 in the plunger 144, and a second plate 240 which surrounds a projection 242 on the diaphragm 226. The spring 164 in the control chamber 136 engages the second plate 240 and holds the diaphragm against the first plate to move shoulder 244 on the plunger 144 against the housing 126. The plunger 144 has an end plate 246 spaced a small distance from a lever means 250.

The lever means 250 is mounted on a pivot pin 252 which is in axial alignment with the plunger means 142. The lever means 250 has an arm 254 with a weight 256 attached to the end thereof. The arm 254 is mounted in a horizontal position with respect to the vertical axis of the trailer allowing the weight 256 to move in a line substantially parallel to and perpendicular to the direction of travel by the trailer. When swaying in the trailer occurs, the weight 256 will move back and forth bringing arm 251 into engagement with the end plate 246. As plunger 144 is moved, projection 242 will engage disc 174 to interrupt the communication of vacuum between chamber 134 and the control chamber 136 and open the poppet valve means 170 to allow air to enter the control chamber 136. This air which is presented to the control chamber 136 will supply the servomotor 14 with an independent actuation signal sufficient to operate the wheel brakes 40. With the brakes 40 actuated, the trailer will accelerate at a lesser rate than the tow vehicle to produce a drag on the hitch which will result in a straightening out of the tow vehicle-trailer combination.

Thus we have provided a tow vehicle-trailer combination with anti-sway means sensitive to oscillation forces in a trailer for supplying a brake servomotor with an independent actuation force sufficient to establish a braking condition in the trailer to alleviate the sway condition.

We claim:

1. In a tow vehicle-trailer braking system having a first brake applying servomotor responsive to an operator input for establishing a first braking signal which will actuate the wheel brakes in the tow vehicle and a second brake applying servomotor responsive to said first braking signal for establishing a second braking signal which will actuate the wheel brakes in the trailer, sway control means for supplying said second brake applying servomotor with an independent actuation signal to momentarily activate the wheels brakes in the trailer, said sway control means comprising:

a housing having a chamber therein with an entrance port, an exit port and an atmospheric port, said entrance port being adapted to receive said first braking signal from said first brake applying servomotor, said exit port being connected to the second brake applying servomotor;

distribution valve means located in said chamber for controlling a first flow path between the entrance port and the exit port;

poppet valve means located in said chamber for controlling a second flow path between the exit port and the atmospheric port;

resilient means connected to said housing for holding said distribution valve means away from said poppet valve means to permit the first braking signal to be communicated through said first flow path without interruption; and mass means responsive to sway for activating said distribution valve means to interrupt communication in the first flow path by overcoming said resilient means to actuate said poppet valve means and allow air to flow through the atmospheric port into the second flow path to establish said independent actuation signal.

2. In the tow vehicle-trailer braking system, as recited in claim 1, wherein said distribution valve means includes:

plunger means having a shoulder thereon for engaging said housing to limit the movement thereof away from the poppet valve means by the resilient means, said plunger means having a tubular section which extends from the shoulder to the end thereof adjacent the poppet valve means, said tubular section having an opening adjacent the shoulder which connects the interior thereof to the entrance port.

3. In the tow vehicle-trailer braking system, as recited in claim 2, wherein said poppet means includes:

disc means located in said chamber for providing a first control seat for said plunger means;

stem means extending through the atmospheric port into the atmosphere for positioning said disc means within said chamber;

plate means loosely located on the stem means outside of said chamber for providing a second control seat; and spring means connected to said housing for holding said plate means against an annular seat surrounding the atmospheric port to prevent air from entering the chamber when said shoulder is held against the housing by the resilient means, said tubular section of the distribution valve means being seated on said disc means upon initial movement by the mass means to seal the entrance port from the exit port and with further movement causing the plate means to move away from said annular seal and allow air to enter into the second flow path.

4. In the tow vehicle-trailer braking system, as recited in claim 3, wherein said mass means includes:

lever means connected to said housing for transmitting said actuation signal to said plunger means; and weight means attached to said lever means and responsive to said sway for moving said plunger means to establish said second flow path through which the air from the atmosphere can be communicated to the second brake applying servomotor.

5. In the tow vehicle-trailer braking system as recited in claim 4, wherein said weight means includes:

a single weight attached to the end of the lever means and mounted on said housing parallel to the axle of the trailer, said single weight responding to lateral forces developed by oscillation of the trailer for establishing said independent actuation signal.

6. In the tow vehicle-trailer braking system, as recited in claim 4, wherein said lever means includes:

a shaft vertically aligned with respect to the axle of said trailer;

an arm located on said shaft;

a first weight on one end of the arm; and a second weight on the other end of the arm, said first weight and said second weight responding to oscillating angular forces to move said arm on the shaft in a corresponding horizontal plane.

7. In the tow vehicle-trailer braking system, as recited in claim 6, wherein said lever means further includes:

cam means connected to said arm for converting angular rotation into linear movement for actuating the distribution valve means.

* * * * *